(12) United States Patent
Miao et al.

(10) Patent No.: US 11,319,919 B2
(45) Date of Patent: May 3, 2022

(54) ROLLING BEARING PROTECTION DEVICE AND VERTICAL-AXIS TIDAL CURRENT ENERGY GENERATING DEVICE APPLYING THE SAME

(71) Applicants: HANGZHOU LHD INSTITUTE OF NEW ENERGY, LLC, Hangzhou (CN); ZHEJIANG UNIVERSITY OF SCIENCE AND TECHNOLOGY, Hangzhou (CN); HANGZHOU LINDONG NEW ENERGY TECHNOLOGY INC., Hangzhou (CN); ZHEJIANG ZHOUSHAN LHD ENERGY DEVELOPMENT CO., LTD., Zhoushan (CN)

(72) Inventors: Xiaonan Miao, Hangzhou (CN); Dongfu Zhao, Hangzhou (CN); Zhenhua Wu, Hangzhou (CN); Jia Li, Hangzhou (CN); Yicheng Ding, Hangzhou (CN); Qipeng Li, Hangzhou (CN); Huajun Xu, Hangzhou (CN); Lijun He, Hangzhou (CN); Huafeng Zhong, Hangzhou (CN); Chao Chen, Hangzhou (CN); Dongfang Hu, Hangzhou (CN); Yangjie Mao, Hangzhou (CN); Enjia Xu, Hangzhou (CN); Yunlin Xie, Hangzhou (CN); Chenhao Wu, Hangzhou (CN); Enle Lin, Hangzhou (CN); Fuwei Zhu, Hangzhou (CN); Anpeng He, Hangzhou (CN); Hongyue Tian, Hangzhou (CN); Fan Yang, Hangzhou (CN)

(73) Assignee: ZHEJIANG ZHOUSHAN LHD ENERGY DEVELOPMENT CO., LTD., Zhoushan (CN)

( * ) Notice: Subject to any disclaimer, the term of this patent is extended or adjusted under 35 U.S.C. 154(b) by 0 days.

(21) Appl. No.: 17/353,557

(22) Filed: Jun. 21, 2021

(65) Prior Publication Data
US 2021/0396202 A1 Dec. 23, 2021

(30) Foreign Application Priority Data
Jun. 19, 2020 (CN) .......................... 202010567572.3

(51) Int. Cl.
*F03B 11/06* (2006.01)
*F03B 11/00* (2006.01)
(Continued)

(52) U.S. Cl.
CPC ............ *F03B 11/06* (2013.01); *F03B 11/006* (2013.01); *F03B 13/264* (2013.01); *F16C 33/6659* (2013.01); *F16C 33/78* (2013.01)

(58) Field of Classification Search
CPC ....... F03B 11/006; F03B 11/06; F03B 11/066; F03B 13/264; F16C 33/6659; F16C 33/78
See application file for complete search history.

(56) References Cited

U.S. PATENT DOCUMENTS 10,371,205 B2 * 8/2019 Lin .......................... F03B 11/06

\* cited by examiner

Primary Examiner — Richard A Edgar
(74) Attorney, Agent, or Firm — Muncy, Geissler, Olds & Lowe, PC

(57) ABSTRACT

This invention provides a rolling bearing protection device and a vertical-axis tidal current energy generating device applying the same. The vertical-axis tidal current energy generating device includes a frame, a vertical-axis hydraulic generator, a rolling bearing, and a rolling bearing protection device. The vertical-axis hydraulic generator includes a main shaft disposed vertical to a horizontal surface, one end of the main shaft is rotatably disposed at a bottom of the frame. The rolling bearing is sleeved on one end of the main (Continued)

shaft. The rolling bearing protection device is disposed above the rolling bearing. The rolling bearing protection device includes a first sealing protection device, a first water leak-proof chamber, and a second sealing protection device disposed in sequence along a gravity direction.

20 Claims, 3 Drawing Sheets

(51) Int. Cl.
    *F16C 33/78*     (2006.01)
    *F16C 33/66*     (2006.01)
    *F03B 13/26*     (2006.01)

ROLLING BEARING PROTECTION DEVICE AND VERTICAL-AXIS TIDAL CURRENT ENERGY GENERATING DEVICE APPLYING THE SAME

CROSS REFERENCE TO THE RELATED APPLICATIONS

This application claims priority to Chinese Patent Application No. 202010567572.3 filed on Jun. 19, 2020, the entire contents of which are incorporated herein by reference.

TECHNICAL FIELD

The present disclosure relates to the field of tidal current energy power generation and, more particularly, to a rolling bearing protection device and a vertical-axis tidal current energy generating device applying the same.

BACKGROUND

Ocean energy, including tidal current energy, wave energy, ocean thermal energy, salinity gradient energy, ocean current energy, etc., is a clean, pollution-free, and renewable energy. The ocean energy is rich in reserves and is widespread thereby possessing excellent development prospects and value. Nowadays, with the increasing shortage of energy and the increasing serious greenhouse effect, energy is required to be low-carbon. Hence, the clean energy, such as the wind energy and the ocean energy, is the future direction of energy development. Among the power generation devices utilizing these clean energy sources, the power generation device utilizing the wind energy is relatively mature, but the power generation device utilizing the ocean energy is still in an initial stage. Universal and mature devices are not available. Most importantly, the power generation cost of the tidal current energy generating device is much higher than that of the power generation device using other energy, which greatly hinders the commercial use and promotion of the tidal current energy power generation.

The tidal current energy generating device mainly adopts two types of hydraulic generators. One is a vertical-axis hydraulic generator, and the other one is a horizontal-axis hydraulic generator. As a main shaft of the vertical-axis hydraulic generator is always turning, bearings are usually used to support the main shaft. Based on the nature of friction, the bearings are generally divided into two types: sliding bearings and rolling bearings. The sliding bearing is the bearing that works under sliding friction. Under the condition of liquid lubrication, sliding surfaces are separated by a lubricant (i.e., water) without direct contact, greatly reducing surface abrasion. Since friction occurs upon the whole surface of the sliding bearing, starting frictional resistance is large. Due to the large frictional resistance, the sliding bearing is easily damaged and short in service life, and the service life of the sliding bearing is no more than five years in actual use. Thus, if the tidal current energy generating device adopts the sliding bearings, the entire generating device has to be pulled out of the water to have the sliding bearings replaced within five years, thereby causing the operation and maintenance cost to be significantly high due to the sliding bearings.

The rolling bearing is a kind of bearing converting the sliding friction between a rotating shaft and a shaft seat to rolling friction, thereby reducing friction loss. If the rolling bearing is maintained properly, the rolling bearing can be used for 20-30 years to the maximum, and the manufacturing cost of the rolling bearing itself is lower than that of the sliding bearing. Therefore, adopting the rolling bearing will greatly reduce the operation and maintenance cost of the tidal current energy generating device. Different from the sliding bearing, the rolling bearing uses lubricating oil as a lubricant. Since the tidal current energy generating device is mostly operating in the water, the sealing requirement of the rolling bearing is very high. Once the external seawater leaks into the rolling bearing from the place where the sealing ring is located, the entire rolling bearing will be discarded, which is unable to reduce cost, and increase the operation and maintenance cost of bearings. However, the existing vertical-axis tidal current energy generating device cannot solve the sealing problem after the rolling bearing has been used for a long while. Because of this, even if the rolling bearing is more suitable for the tidal current energy generating device, the existing vertical-axis tidal current energy generating devices are still using the sliding bearings.

SUMMARY

In order to overcome at least one of the deficiencies in the prior art, the present disclosure provides a rolling bearing protection device and a vertical-axis tidal current energy generating device applying the same.

In the first aspect, the present disclosure provides a rolling bearing protection device, applied to a vertical-axis tidal current energy generating device. The vertical-axis tidal current energy generating device includes a rolling bearing, and the rolling bearing protection device is disposed above the rolling bearing. The rolling bearing protection device includes a first sealing protection device, a first water leak-proof chamber, and a second sealing protection device disposed in sequence along a gravity direction. The first sealing protection device includes at least one first sealing assembly, the first water leak-proof chamber includes a first water collecting tank and a first drainage hole, the first drainage hole is disposed at a side wall of the first water collecting tank, and the second sealing protection device comprises at least one second sealing assembly.

In one embodiment of the first aspect of the present disclosure, the second sealing protection device includes a second water leak-proof chamber, the second water leak-proof chamber includes a second water collecting tank and a second drainage hole, and the second drainage hole is disposed at a side wall of the second water collecting tank.

In one embodiment of the first aspect of the present disclosure, the second sealing protection device includes a stop structure, and the stop structure is disposed above the second water collecting tank to stop water in the second water collecting tank from spilling over.

In the second aspect, the present disclosure further provides a vertical-axis tidal current energy generating device, including a frame, a vertical-axis hydraulic generator, a bearing, and a rolling bearing protection device. The vertical-axis hydraulic generator includes a main shaft disposed vertical to a horizontal surface, and one end of the main shaft is rotatably disposed at a bottom of the frame. The rolling bearing is sleeved on the end of the main shaft. The rolling bearing protection device is disposed above the rolling bearing. The rolling bearing protection device includes a first sealing protection device, a first water leak-proof chamber, and a second sealing protection device disposed in sequence along a gravity direction. The first sealing protection device includes at least one first sealing assembly, the first water leak-proof chamber includes a first water collecting tank and a first drainage hole, the first drainage hole is disposed at a side wall of the first water collecting tank, and the second sealing protection device comprises at least one second sealing assembly.

In one embodiment of the second aspect of the present disclosure, the second sealing protection device includes a second water leak-proof chamber, the second water leak-proof chamber includes a second water collecting tank and a second drainage hole, and the second drainage hole is disposed at a side wall of the second water collecting tank.

In one embodiment of the second aspect of the present disclosure, the second sealing protection device includes a stop structure, and the stop structure is disposed above the second water collecting tank to stop water in the second water collecting tank from spilling over.

In one embodiment of the second aspect of the present disclosure, the vertical-axis tidal current energy generating device further includes a bearing oil supply pipe disposed inside the main shaft, and one end of the bearing oil supply pipe communicates with a lubricant cavity of the rolling bearing to supply lubricating oil into the lubricant cavity.

In one embodiment of the second aspect of the present disclosure, the vertical-axis tidal current energy generating device further includes an oil pumping pipe and an oil pump disposed inside the main shaft, one end of the oil pumping pipe communicates with a lubricant cavity of the rolling bearing, and the oil pump is disposed at the other end of the oil pumping pipe to pump lubricating oil out of the lubricant cavity via the oil pumping pipe.

In one embodiment of the second aspect of the present disclosure, the vertical-axis tidal current energy generating device further includes a liquid level sensor, a water pumping pipe, and a water pump, the first drainage hole communicates with interior of the main shaft, the liquid level sensor detects a water level of leaking water accumulated inside the main shaft, and when the liquid level sensor detects the water level inside the main shaft reaches a preset value, the water pump operates to pump water in the main shaft out of the vertical-axis tidal current energy generating device by the water pumping pipe.

In one embodiment of the second aspect of the present disclosure, the main shaft is hollow and has a specific inner diameter to allow maintenance personnel to enter into the main shaft.

In one embodiment of the second aspect of the present disclosure, the vertical-axis tidal current energy generating device further includes at least one air-blower and a ventilation duct, the ventilation duct is disposed inside the main shaft, and the ventilation duct extends from above a water surface to below the water surface to enable air inside the main shaft to be exchanged.

In one embodiment of the second aspect of the present disclosure, the other end of the main shaft is rotatably disposed at a top of the frame via another rolling bearing.

In summary, a water leak-proof chamber is arranged between two sealing protection devices in the rolling bearing protection device provided in the present disclosure. Even if aging and loosing of the seals occurs after the long use of the seals, leaking water will be collected and accumulated by the first water leak-proof chamber, and will not enter the interior of the rolling bearing. The second sealing protection device is provided below the first water leak-proof chamber, which constitutes sealing safety redundancy and eliminates all the possibilities of the water leaking into the interior of the rolling bearing, thereby ensuring the operation environment of the rolling bearing and greatly extending the service life of the rolling bearing. Therefore, the cost of the vertical-axis tidal current energy generating device can be significantly reduced so as to promote the commercial application of the vertical-axis tidal current energy generating device.

The above and other objects, features, and advantages of the present disclosure will become more apparent and understood by the preferred embodiments with reference to the drawings, the detailed description is as follows.

DETAILED DESCRIPTION OF THE INVENTION

Figure 1:
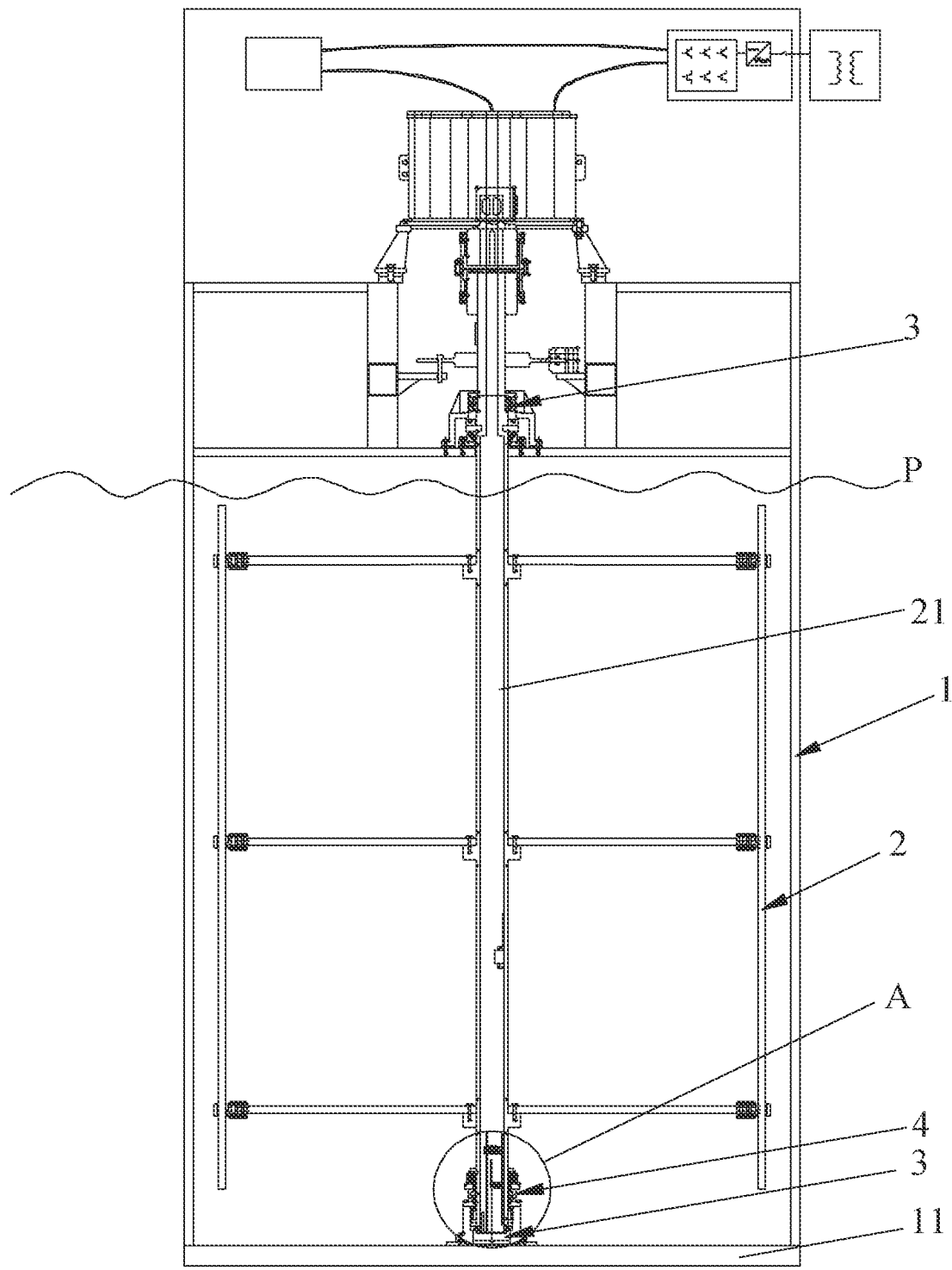
FIG. 1 is a schematic diagram showing a vertical-axis tidal current energy generating device according to one embodiment of the present disclosure.
Figure 2:
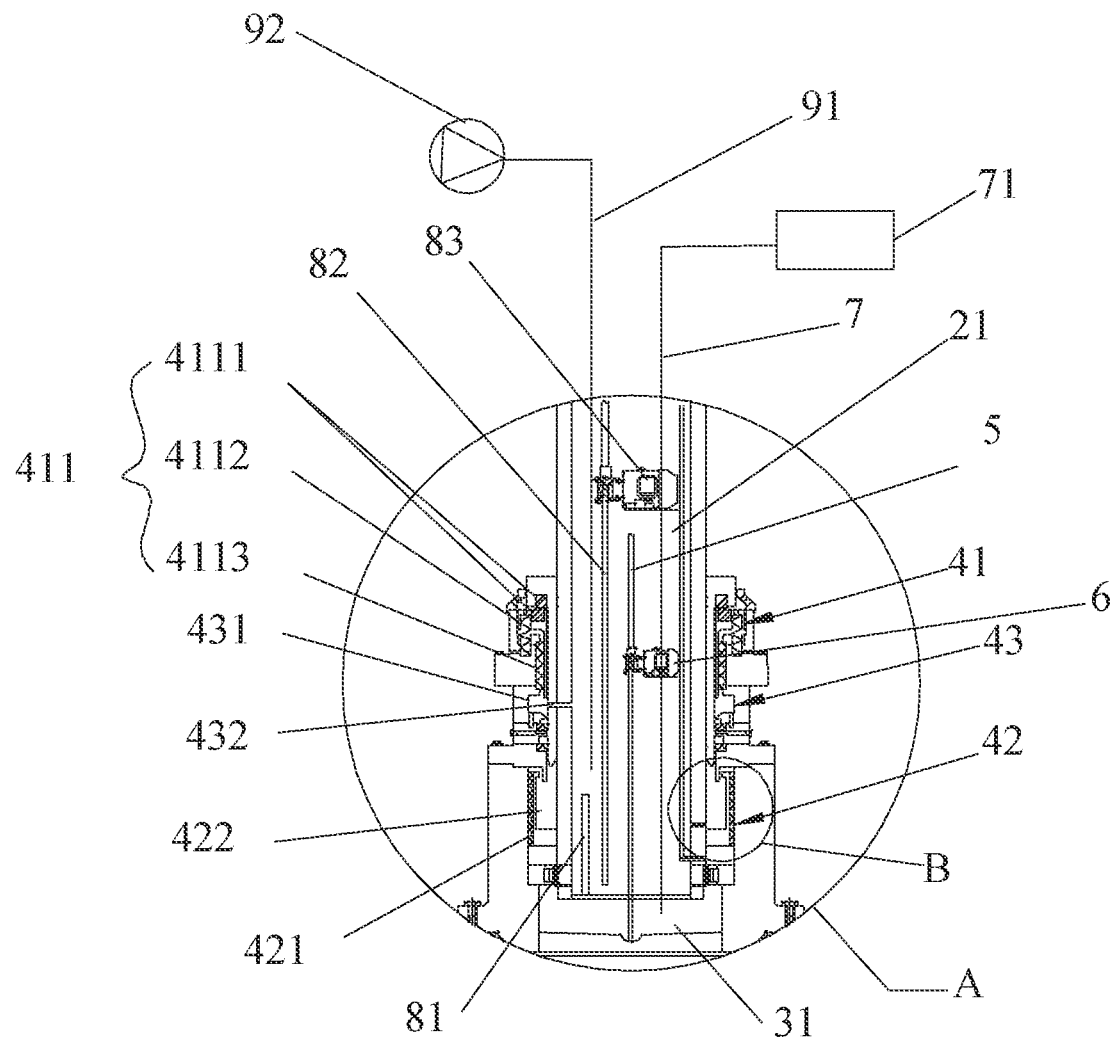
FIG. 2 is an enlarge schematic diagram of the circle mark A in FIG. 1.
Figure 3:
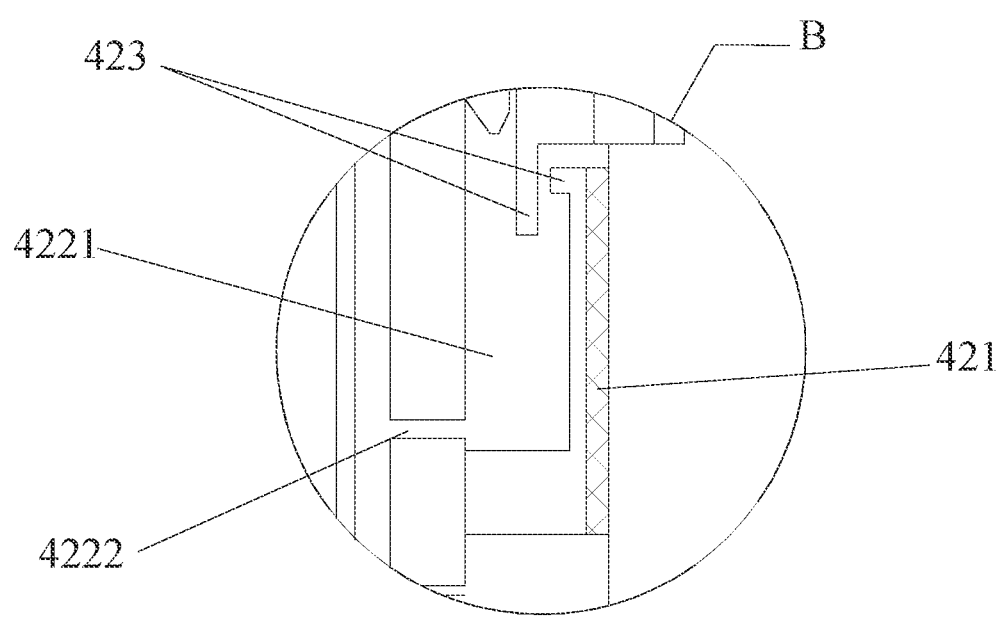
FIG. 3 is an enlarged schematic diagram of the circle mark B in FIG. 2.

As shown in FIG. 1 to FIG. 3, a vertical-axis tidal current energy generating device provided in one embodiment of the present disclosure includes a frame 1, a vertical-axis hydraulic generator 2, a rolling bearing 3, and a rolling bearing protection device 4.

The vertical-axis hydraulic generator 2 includes a main shaft 21 disposed vertical to a horizontal surface P, and one end of the main shaft 21 is rotatably fixed at the bottom 11 of the frame 1. In the embodiment, said end of the main shaft 21 is the bottom end as shown in FIG. 1. A hydraulic turbine of the vertical-axis hydraulic generator is located below a water surface, and a generator of the vertical-axis hydraulic generator is located above the water surface. The specific type of the vertical-axis hydraulic generator is not limited in the present disclosure. The hydraulic turbine in the present disclosure may use a lift type impellor or a drag type impellor.

The rolling bearing 3 is sleeved on the end, i.e. the bottom end, of the main shaft 21. In the embodiment, the rolling bearing 3 has a lubricant cavity 31 filled with lubricating oil. The vertical-axis tidal current energy generating device in the present disclosure adopts the rolling bearing instead of a sliding bearing, such that the friction coefficient of the bearing is lower and the bearing capacity is higher, thereby solving the problem of high friction and low bearing capacity caused by using the sliding bearing in the conventional vertical-axis tidal current energy generating device.

In the embodiment, the other end of the main shaft 21 is rotatably fixed at the top of the frame 1 via another rolling bearing 3. In detail, the vertical-axis tidal current energy generating device includes two rolling bearings 3 sleeved on the two places of the main shaft 21, respectively. That is, the two rolling bearings 3 are sleeved on the bottom end and the place near the top end of the main shaft 21 (the two rolling bearings 3 are fixed at the top and bottom of the frame 1, respectively). By this setting, both ends of the main shaft 21 can be "restricted", thereby increasing the resistance capability of the main shaft 21 against the water flow impact. The existing vertical-axis tidal current energy generating device only has a rolling bearing disposed at the portion near the top end of the main shaft, and the restriction at the bottom end of the main shaft by the rolling bearing is abandoned since the cost of replacement of the lubricating oil at the bottom end of the main shaft is very high. Such a vertical-axis tidal current energy generating device cannot be "made deep" in the water depth direction (once the generating device in the prior art is placed deep in the ocean, as the bottom of the main shaft is not restricted, the main shaft will not be able to resist the huge impact of the water flow and the main shaft is easy to be bent or even broken in the middle), which great limits the generation power of the vertical-axis tidal current energy generating device. The vertical-axis tidal current energy generating device of the present embodiment can effectively overcome this problem in the prior art, and the application of a long main shaft is achieved by "two-point restriction", thereby achieving the full use of the tidal current energy in the water depth direction.

If the vertical-axis tidal current energy generating device adopts restriction at three or more than three points, although the main shaft can be better supported, the machining accuracy of manufacturing the main shaft will be very high in order to match the sizes of the main shaft and the bearings, which causes the increase of cost on the contrary. The vertical-axis tidal current energy generating device of the present embodiment has two ends of the main shaft restricted, such that the requirement for machining accuracy can be effectively decreased, which allows the main shaft to be supported well and makes the cost controlled effectively.

The rolling bearing protection device 4 is disposed above the rolling bearing 3. In the embodiment, the rolling bearing protection device 4 surrounds the gaps between the rolling bearing 3 and the main shaft 21 to protect the rolling bearing 3 from being invaded by the external seawater. The word "above" and "below", "top" and "bottom" mentioned in the present disclosure are relative to the gravity direction. The gravity direction mentioned in the present disclosure is the direction from top to bottom, as seen from the perspective shown in FIG. 1. The rolling bearing protection device 4 includes a first sealing protection device 41, a first water leak-proof chamber 43, and a second sealing protection device 42 arranged in sequence along the gravity direction.

The first sealing protection device 41 includes at least one first sealing assembly 411. In the embodiment, the first sealing assembly 411 is composed of a plurality of different types of seals, such that safety redundancy is constituted by adopting different types of seals to ensure sealing performance. In detail, the first sealing assembly 411 includes at least two sealing rings 4111 at the top configured to block the sediment in the external water flow. The sealing rings 4111 can be made of a carbon-based composite material. However, the material of the sealing rings is not limited thereto. The first sealing assembly 411 further includes a spring 4112 to apply a pressure to the sealing rings 4111 thus to make the two sealing rings 4111 closely fit. The first sealing assembly 411 may further include a sealing spacer 4113 disposed below the sealing rings 4111 and the spring 4112. The specific configuration form of the first sealing assembly is not limited in the present disclosure. In other embodiments, the first sealing assembly may not have the spring and only have multiple sealing rings, or the first sealing assembly may employ any seal, such as a gas seal, a metal seal, and so on. In another embodiment, the first sealing assembly may also include a water collecting tank and a drainage hole as described below. In another embodiment, the first sealing protection device 41 may include two or more first sealing assemblies 411.

The first water leak-proof chamber 43 includes a first water collecting tank 431 and a first drainage hole 432, and the first drainage hole 432 is disposed at a side wall of the first water collecting tank 431. In the embodiment, if the first sealing protection device 41 ages and loosens after long-term use, there may be a small amount of seawater leaking from the gap between the first sealing protection device 41 and the main shaft 21. Since the first water collecting tank 431 is disposed below the first sealing protection device 41, the first water collecting tank 431 can collect and accumulate the seawater leaking from the first sealing protection device 41, thereby preventing the seawater from invading the interior of the rolling bearing 3. When the water level of the collected and accumulated leaking water reaches the place where the first drainage hole 432 is located, since the first drainage hole 432 communicates the first water collecting tank 431 with the interior of the main shaft 21, the accumulated leaking water can flow to the interior of the main shaft 21 via the first drainage hole 432.

The second sealing protection device 42 includes at least one second sealing assembly 421. The specific configuration form of the second sealing assembly is not limited in the present disclosure. The second sealing assembly may be in any sealing form such as a sealing ring, a sealing gasket, an airtight seal, a metal seal and so on. In other embodiments, the second sealing protection device may include two or more than two second sealing assemblies. In this embodiment, the second sealing protection device 42 includes a second water leak-proof chamber 422, the second water leak-proof chamber 422 includes a second water collecting tank 4221 and a second drainage hole 4222, and the second drainage hole 4222 is disposed at a side wall of the second water collecting tank 4221. Preferably, the second drainage hole 4222 is located near the bottom of the side wall of the second water collecting tank 4221, thereby facilitating timely discharge of the leaking water collected and accumulated in the second water collecting tank 4221. After the vertical-axis tidal current energy generating device operates for several years, the amount of leaking water stored in the first water collecting tank 431 is relatively large, the leaking water may not be discharged to the interior of the main shaft 21 via the first drainage hole 432 in time. At that time, if the second sealing protection device 42 is not provided, there may still be risk of allowing the seawater to flow into the rolling bearing 3 disposed below. In order to ensure that the seawater cannot invade the interior of the rolling bearing 3, the present disclosure further provides the second sealing protection device 42 below the first water leak-proof chamber 43 so as to further ensure the operation environment of the rolling bearing and to extend the service life of the rolling bearing.

When the amount of leaking water in the second water leak-proof chamber 422 is relatively large, since the main shaft 21 is always rotating, the accumulated leaking water may spill under the action of centrifugal force. In the embodiment, the second sealing protection device 42 includes a stop structure 423, and the stop structure 423 is disposed above the second water collecting tank 4221 thus to stop the accumulated water in the second water collecting tank 4221 from spilling over. In the embodiment, protruding portions are provided at the side wall and top of the second water leak-proof chamber 422, i.e. forming the stop structure.

Due to the corrosiveness of seawater and the huge impact force of water flow, the service life of the seals of the vertical-axis tidal current energy generating device is often no more than five years.

In practical applications, less than five years, in order to ensure that the rolling bearing is not invaded by the seawater, the existing vertical-axis tidal current energy generating device has to be lifted out of the water to have the seals replaced, which makes the cost of tidal current energy power generation very high. The present disclosure provides the first water leak-proof chamber under the first sealing protection device and further provides the second sealing protection device under the first water leak-proof chamber, which ensures that the external seawater cannot flow into the interior of the rolling bearing, thereby effectively extending the service life of the rolling bearing and greatly reducing the frequency of maintenance or replacement of the rolling bearing. Thus, the maintenance cost of the vertical-axis tidal current energy generating device can be significantly reduced.

In the embodiment, the vertical-axis tidal current energy generating device further includes an oil pumping pipe 5 and an oil pump 6. The oil pumping pipe 5 is disposed through the interior of the main shaft 21, and one end of the oil pumping pipe 5 communicates with a lubricant cavity 31 of the rolling bearing 3. The oil pump 6 communicates with the other end of the oil pumping pipe 5 thus to pump lubricating oil out of the lubricant cavity 31 via the oil pumping pipe 5. In the embodiment, the oil pump 6 is disposed inside the main shaft 21. However, the present disclosure is not limited thereto. In other embodiments, the oil pump may be located above the water surface and out of the main shaft.

In the embodiment, the vertical-axis tidal current energy generating device further includes a bearing oil supply pipe 7. The bearing oil supply pipe 7 is disposed through the interior of the main shaft 21, and one end of the bearing oil supply pipe 7 communicates with the lubricant cavity 31 of the rolling bearing 3 to supply the lubricating oil into the lubricant cavity 31. In actual application, the other end of the bearing oil supply pipe 7 may communicate with an oil storage tank 71 having the fresh lubricating oil stored therein. In the embodiment, the oil storage tank 71 can be disposed inside the main shaft 21. However, the present disclosure is not limited thereto. In other embodiments, the oil storage tank may be located above the water surface and out of the main shaft.

The lubricant for the rolling bearing is the lubricating oil. When the lubricating oil functions normally, the lubricating oil can reduce the friction between the components, reduce heat generation, and absorb some sediment, thereby keeping the device in good operation. However, the lubricating oil has a period of validity and cannot be used for a long time. The lubricating oil must be replaced at a certain period of time thus to be good for the service life of the entire shaft and bearing system. In particular, after the rolling bearing has been used for a period of time, the lubricating oil may deteriorate due to high temperatures, impurity pollution and other factors, showing discoloration, multi-foam and even emulsification, which greatly reduces lubrication effect. In order to ensure the lubricating quality of the lubricating oil, the lubricating oil must be replaced regularly (generally no more than six months). If the lubricating oil is not replaced in time, since the lubricating oil cannot achieves a good lubrication function, the lubricating oil not only accelerates the wear of components, affecting the service life, but also forms resistance against the rotation of the main shaft, affecting the rotation of the entire turbine thus to affect the generation power.

Due to the complex environment in the ocean, the existing vertical-axis tidal current energy generating device cannot achieve underwater replacement of the lubricating oil. If the lubricating oil in the conventional vertical-axis tidal current energy generating device needs to be checked and replaced, the operation of the turbine has to be stopped at first, and then the entire hydraulic turbine needs to be lifted from underwater to be above the water surface. Then, the bearing needs to be removed, such that the lubricating oil can be replaced to conduct the maintenance of the bearing. Therefore, the maintenance of the bearing of the conventional vertical-axis tidal current energy generating device is time-consuming and laborious, which causes the maintenance to be much high.

For the vertical-axis tidal current energy generating device provided in the present disclosure, when the lubricating oil needs to be replaced, the oil pump 6 is controlled to work, so as to pump the deteriorating lubricating oil out of the lubricant cavity 31. No-deteriorating lubricating oil flows into the lubricant cavity 31 via the bearing oil supply pipe 7 under the action of gravity. The replacement of lubricating oil is realized underwater by removing the "old" oil and injecting the "fresh" oil. Therefore, the vertical-axis tidal current energy generating device provided in the present disclosure can realize the replacement of lubricating oil without lifting the hydraulic turbine to be above the water surface, which greatly reduces the operating cost of the vertical-axis tidal current energy generating device.

In particular, in this embodiment, the bearing oil supply pipe 7 and the oil pumping pipe 5 are arranged inside the main shaft 21, which protects the pipeline against impact and corrosion of the external seawater and also facilitates check, repair, replacement of the bearing oil supply pipe 7 and the oil pumping pipe 5.

In the embodiment, the vertical-axis tidal current energy generating device further includes a liquid level sensor 81, a water pumping pipe 82, and a water pump 83. When the leaking water enters into the main shaft 21 from the first drainage hole, the leaking water is accumulated at the bottom of the main shaft 21, and the liquid level sensor 81 detects the water level inside the main shaft 21. When the liquid level sensor 81 detects that the water level in the main shaft 21 reaches a preset value, the water pump 83 operates to pump water in the main shaft 21 out of the vertical-axis tidal current energy generating device via the water pumping pipe 82.

The liquid level sensor 81, the water pumping pipe 82, and the water pump 83 are provided in this embodiment. In the embodiment, the first drainage hole 432 and the second drainage hole 4222 communicate with the interior of the main shaft 21, the leaking water in the first water collecting tank 431 and the second water collecting tank 4221 can be discharged to the interior of the main shaft 21. The leaking water can be accumulated at the bottom of the main shaft 21 under the action of gravity. The liquid level sensor 81 detects the water level of leaking water accumulated inside the main shaft. When the liquid level sensor 81 detects the water level inside the main shaft 21 reaches the preset value, the water pump 83 operates to pump the accumulated water in the main shaft 21 out of the vertical-axis tidal current energy generating device via the water pumping pipe 82.

In the embodiment, the main shaft 21 is hollow and has a specific inner diameter to allow maintenance personnel to enter into the main shaft 21. The main shaft 21 has an opening above the horizontal plane P, a maintenance person or a maintenance machine can enter the interior of the main shaft 21 through the opening and finally inspects, maintains or repairs the pipes and components disposed inside the main shaft 21. The specific numerical value of the inner diameter of the main shaft 21 in the present disclosure is not limited. If the maintenance operation is performed by a person, the inner diameter width of the main shaft 21 should be large enough for an adult to pass through, e.g. 1.5 m or more. Accordingly, the inner wall of the main shaft 21 can be provided with a ladder, facilitating the maintenance personnel to reach the bottom of the main shaft 21 to check and repair the rolling bearing 3, to maintain and replace the pipelines such as the oil pumping pipe or the water pumping pipe, and to maintain and replace the oil pump or the water pump. If the maintenance operation is performed by a robot or a machine, the inner diameter of the main shaft only needs to be large enough for the maintenance machine to pass through.

In the embodiment, the vertical-axis tidal current energy generating device further includes at least one ventilation duct 91 and an air-blower 92, the ventilation duct 91 is disposed inside the main shaft 21, and the ventilation duct 91 extends from above the water surface to below the water surface to enable air inside the main shaft 21 to be exchanged. For the existing vertical-axis tidal current energy generating device, the situation of underwater installation or maintenance has not been considered. The inventor of the present disclosure previously considered the underwater maintenance, but ignored the problems of toxic and harmful gases and excessive carbon dioxide concentration caused by the high temperature generated by the machine's heat due to the long-term operation of the internal machine. If work needs to be carried out underwater, people need to stay underwater for a long time, and the situation such as lack of oxygen or carbon dioxide poisoning easily happens. The air-blower and ventilation duct of the present embodiment constitute a ventilation system, which greatly guarantees the safety of maintenance personnel or installation personnel underwater. When the person needs to work in the working area under the water surface, the air-blower can be activated to exchange the air in the working area under the water surface. In terms of specific applications, the ventilation system can have more complex structures, such as a separate air supply system and air exhaust system, etc., which will not be described in detail herein.

In summary, a water leak-proof chamber is arranged between two sealing protection devices in the rolling bearing protection device provided in the present disclosure. Even if the seals start to age and loose after the long use of the seals, the leaking water will be collected and accumulated by the first water leak-proof chamber, and will not enter the interior of the rolling bearing. The second sealing protection device is provided below the first water leak-proof chamber, which constitutes sealing safety redundancy and eliminates all the possibilities of the water leaking into the interior of the rolling bearing, thereby ensuring the operation environment of the rolling bearing and greatly extending the service life of the rolling bearing. Therefore, the cost of the vertical-axis tidal current energy generating device can be significantly reduced so as to promote the commercial application of the vertical-axis tidal current energy generating device. The vertical-axis tidal current energy generating device in the present disclosure adopts the rolling bearing instead of the sliding bearing, such that the friction coefficient of the bearing is lower and the bearing capacity is higher, thereby solving the problem of high friction and low bearing capacity caused by using the sliding bearing in the conventional vertical-axis tidal current energy generating device. Thus, the operation cost and maintenance cost can be significantly reduced.

Further, the bearing oil supply pipe and the oil pumping pipe of the present embodiment are provided inside the main shaft, which protects the pipelines can be against the impact and corrosion of the external seawater, and also facilitates check, repair, replacement of the bearing oil supply pipe and the oil pumping pipe at the same time. The structure is simpler, and the arrangement of lines is more reasonable.

The rolling bearings are disposed at the bottom and top of the main shaft in the embodiment, such that both ends of the main shaft can be "restricted", thereby increasing the resistance capability of the main shaft against the water flow impact. Thus, the main shaft can be made long so as to make full use of the ocean energy and increase generation power. For the vertical-axis tidal current energy generating device provided in the embodiment, when the lubricating oil needs to be replaced, the oil pump is controlled to work, so as to pump the deteriorating lubricating oil out of the lubricant cavity 31. No-deteriorating lubricating oil flows into the lubricant cavity via the bearing oil supply pipe under the action of gravity, thereby realizing the replacement of lubricating oil underwater. Therefore, the vertical-axis tidal current energy generating device provided in the embodiment can realize the replacement of lubricating oil without lifting the hydraulic turbine to be above the water surface, which makes the maintenance of the rolling bearing easier and greatly reduces the maintenance cost.

Although the invention is described above in considerable detail with reference to preferred embodiments, the disclosure is not used for limiting the scope of the invention. Persons having ordinary skill in the art may make various modifications and changes without departing from the scope and spirit of the invention. Therefore, the scope of this invention is subject to the scope of the claims.

What is claimed is:

1. A rolling bearing protection device, applied to a vertical-axis tidal current energy generating device, wherein the vertical-axis tidal current energy generating device comprises a rolling bearing, the rolling bearing protection device is disposed above the rolling bearing, and the rolling bearing protection device comprises:
   a first sealing protection device, a first water leak-proof chamber, and a second sealing protection device disposed in sequence along a gravity direction, wherein the first sealing protection device comprises at least one first sealing assembly, the first water leak-proof chamber comprises a first water collecting tank and a first drainage hole, the first drainage hole is disposed at a side wall of the first water collecting tank, and the second sealing protection device comprises at least one second sealing assembly.

2. The rolling bearing protection device according to claim 1, wherein the second sealing protection device comprises a second water leak-proof chamber, the second water leak-proof chamber comprises a second water collecting tank and a second drainage hole, and the second drainage hole is disposed at a side wall of the second water collecting tank.

3. The rolling bearing protection device according to claim 2, wherein the second sealing protection device comprises a stop structure, and the stop structure is disposed above the second water collecting tank to stop water in the second water collecting tank from spilling over.

4. A vertical-axis tidal current energy generating device, comprising:
   a frame;
   a vertical-axis hydraulic generator, comprising a main shaft disposed vertical to a horizontal surface, and one end of the main shaft being rotatably disposed at a bottom of the frame;
   a rolling bearing sleeved on the end of the main shaft; and
   a rolling bearing protection device disposed above the rolling bearing, wherein the rolling bearing protection device comprises a first sealing protection device, a first water leak-proof chamber, and a second sealing protection device disposed in sequence along a gravity direction, the first sealing protection device comprises at least one first sealing assembly, the first water leak-proof chamber comprises a first water collecting tank and a first drainage hole, the first drainage hole is disposed at a side wall of the first water collecting tank, and the second sealing protection device comprises at least one second sealing assembly.

5. The vertical-axis tidal current energy generating device according to claim 4, wherein the second sealing protection device comprises a second water leak-proof chamber, the second water leak-proof chamber comprises a second water collecting tank and a second drainage hole, and the second drainage hole is disposed at a side wall of the second water collecting tank.

6. The vertical-axis tidal current energy generating device according to claim 5, wherein the second sealing protection device comprises a stop structure, and the stop structure is disposed above the second water collecting tank to stop water in the second water collecting tank from spilling over.

7. The vertical-axis tidal current energy generating device according to claim 4, wherein the vertical-axis tidal current energy generating device further comprises a bearing oil supply pipe disposed inside the main shaft, and one end of the bearing oil supply pipe communicates with a lubricant cavity of the rolling bearing to supply lubricating oil into the lubricant cavity.

8. The vertical-axis tidal current energy generating device according to claim 5, wherein the vertical-axis tidal current energy generating device further comprises a bearing oil supply pipe disposed inside the main shaft, and one end of the bearing oil supply pipe communicates with a lubricant cavity of the rolling bearing to supply lubricating oil into the lubricant cavity.

9. The vertical-axis tidal current energy generating device according to claim 6, wherein the vertical-axis tidal current energy generating device further comprises a bearing oil supply pipe disposed inside the main shaft, and one end of the bearing oil supply pipe communicates with a lubricant cavity of the rolling bearing to supply lubricating oil into the lubricant cavity.

10. The vertical-axis tidal current energy generating device according to claim 4, wherein the vertical-axis tidal current energy generating device further comprises an oil pumping pipe and an oil pump disposed inside the main shaft, one end of the oil pumping pipe communicates with a lubricant cavity of the rolling bearing, and the oil pump is disposed at the other end of the oil pumping pipe to pump lubricating oil out of the lubricant cavity via the oil pumping pipe.

11. The vertical-axis tidal current energy generating device according to claim 5, wherein the vertical-axis tidal current energy generating device further comprises an oil pumping pipe and an oil pump disposed inside the main shaft, one end of the oil pumping pipe communicates with a lubricant cavity of the rolling bearing, and the oil pump is disposed at the other end of the oil pumping pipe to pump lubricating oil out of the lubricant cavity via the oil pumping pipe.

12. The vertical-axis tidal current energy generating device according to claim 6, wherein the vertical-axis tidal current energy generating device further comprises an oil pumping pipe and an oil pump disposed inside the main shaft, one end of the oil pumping pipe communicates with a lubricant cavity of the rolling bearing, and the oil pump is disposed at the other end of the oil pumping pipe to pump lubricating oil out of the lubricant cavity via the oil pumping pipe.

13. The vertical-axis tidal current energy generating device according to claim 4, wherein the vertical-axis tidal current energy generating device further comprises a liquid level sensor, a water pumping pipe, and a water pump, the first drainage hole communicates with interior of the main shaft, the liquid level sensor detects a water level of leaking water accumulated inside the main shaft, and when the liquid level sensor detects the water level inside the main shaft reaches a preset value, the water pump operates to pump water in the main shaft out of the vertical-axis tidal current energy generating device by the water pumping pipe.

14. The vertical-axis tidal current energy generating device according to claim 5, wherein the vertical-axis tidal current energy generating device further comprises a liquid level sensor, a water pumping pipe, and a water pump, the first drainage hole communicates with interior of the main shaft, the liquid level sensor detects a water level of leaking water accumulated inside the main shaft, and when the liquid level sensor detects the water level inside the main shaft reaches a preset value, the water pump operates to pump water in the main shaft out of the vertical-axis tidal current energy generating device by the water pumping pipe.

15. The vertical-axis tidal current energy generating device according to claim 6, wherein the vertical-axis tidal current energy generating device further comprises a liquid level sensor, a water pumping pipe, and a water pump, the first drainage hole communicates with interior of the main shaft, the liquid level sensor detects a water level of leaking water accumulated inside the main shaft, and when the liquid level sensor detects the water level inside the main shaft reaches a preset value, the water pump operates to pump water in the main shaft out of the vertical-axis tidal current energy generating device by the water pumping pipe.

16. The vertical-axis tidal current energy generating device according to claim 4, wherein the main shaft is hollow and has a specific inner diameter to allow maintenance personnel to enter into the main shaft.

17. The vertical-axis tidal current energy generating device according to claim 6, wherein the main shaft is hollow and has a specific inner diameter to allow maintenance personnel to enter into the main shaft.

18. The vertical-axis tidal current energy generating device according to claim 16, wherein the vertical-axis tidal current energy generating device further comprises at least one air-blower and a ventilation duct, the ventilation duct is disposed inside the main shaft, and the ventilation duct extends from above a water surface to below the water surface to enable air inside the main shaft to be exchanged.

19. The vertical-axis tidal current energy generating device according to claim 17, wherein the vertical-axis tidal current energy generating device further comprises at least one air-blower and a ventilation duct, the ventilation duct is disposed inside the main shaft, and the ventilation duct extends from above a water surface to below the water surface to enable air inside the main shaft to be exchanged.

20. The vertical-axis tidal current energy generating device according to claim 4, wherein the other end of the main shaft is rotatably disposed at a top of the frame via another rolling bearing.

* * * * *

UNITED STATES PATENT AND TRADEMARK OFFICE
CERTIFICATE OF CORRECTION

PATENT NO. : 11,319,919 B2
APPLICATION NO. : 17/353557
DATED : May 3, 2022
INVENTOR(S) : Xiaonan Miao et al.

It is certified that error appears in the above-identified patent and that said Letters Patent is hereby corrected as shown below:

On the Title Page

In (73) Assignee, change "HANGZHOU LHD INSTITUTE OF NEW ENERGY, LLC, Zhoushan (CN)" to -- HANGZHOU LHD INSTITUTE OF NEW ENERGY, LLC, Hangzhou (CN); ZHEJIANG UNIVERSITY OF SCIENCE AND TECHNOLOGY, Hangzhou (CN); HANGZHOU LINDONG NEW ENERGY TECHNOLOGY INC., Hangzhou (CN); ZHEJIANG ZHOUSHAN LHD ENERGY DEVELOPMENT CO., LTD., Zhoushan (CN) --.

Signed and Sealed this
Seventh Day of May, 2024

Katherine Kelly Vidal
*Director of the United States Patent and Trademark Office*